Patented Aug. 24, 1943

2,327,940

UNITED STATES PATENT OFFICE 2,327,940

METHOD OF PRESERVING LATEX AND PRODUCT THEREOF

William D. Stewart, Akron, Ohio, assignor to The B. F. Goodrich Company, New York, N. Y., a corporation of New York No Drawing. Application December 21, 1940, Serial No. 371,202

13 Claims. (Cl. 260—820)

This invention relates to a method of preserving latex, particularly fresh latex, and to the product thereof.

Latex that has been freshly-collected from the rubber trees contains enzymes that, together with the bacteria picked up in handling the latex, cause the latex to putrefy and coagulate within a relatively short time. Various methods of preserving the latex have been proposed in the past, such as the ammonia treatment now commonly used, but all these have been only generally effective and all have been more or less unsatisfactory.

I have discovered a method of preserving latex, particularly freshly-collected latex, that produces a sterile, stable latex that will stand for long periods without putrefaction or coagulation. By the method of this invention the pH of the latex is adjusted to a point not less than 9.8 nor more than 10.0 by means of buffer solutions, alkalies, or the like. The preferred manner is by adding ammonia to the latex in from 0.25% to 0.35% by weight of the latex. To this latex is then added small quantities of one or more of the quinoline compounds which comprise quinoline itself as well as quinoline derivatives. These compounds are preferably used in quantities between 0.01% and 0.20% of the compound by weight of the latex and may be added either before or after the pH of the latex has been adjusted to between 9.8 and 10.0. If necessary after the addition of the compound or compounds the pH is readjusted to bring it within the range of 9.8 to 10.0. The latex should be treated by the method of this invention without any undue interval of time after it has been collected from the trees, and preferably within eighteen hours after such collecting. Examples of the quinoline compounds that can be used in this invention to produce a preserved latex are quinoline, oxyquinoline sulfate, 2-amino-quinoline, 3-chloroquinoline, decahydro-quinoline, 5,8-dichloroquinoline, 2,4-dimethyl-quinoline, 6-methoxyquinoline, 6-methyl quinoline, 7-nitro-quinoline, 2-phenyl quinoline, and 2,3,4-trimethyl quinoline, as well as many others of like nature.

In a specific example of this invention, ammonia is added to freshly-collected latex until the pH is raised to 10.0 and immediately thereafter 0.10% of quinoline by weight of the latex is added to the latex. This method produces a latex that will remain well preserved through long periods of shipment and storage and although the method is more useful for preserving freshly-collected latex it is also applicable for latex that has been previously preserved by other methods.

As will be apparent from the foregoing the preserved latex prepared according to this invention ordinarily will contain only the natural latex itself and the ammonia or other material added in adjusting the pH together with the quinoline compounds as described. Any of the usual compounding or conditioning agents may later be added as desired to prepare the latex for specific uses but such materials preferably are not added at the plantation.

Having disclosed my invention it is my desire to protect it broadly within the spirit and scope of the appended claims.

I claim:

1. The method of preserving latex which comprises adjusting the pH of the latex to not less than 9.8 nor more than 10.0 and adding a small proportion of a quinoline compound.

2. The method of preserving freshly-collected latex which comprises adjusting the pH of the latex to not less than 9.8 nor more than 10.0 and adding a small proportion of a quinoline compound.

3. The method of preserving freshly-collected latex which comprises treating the latex with sufficient alkali to raise the pH to not less than 9.8 nor more than 10.0 and adding a small proportion of a quinoline compound.

4. The method of preserving freshly-collected latex which comprises treating the latex with sufficient ammonia to raise the pH to not less than 9.8 nor more than 10.0 and adding a small proportion of a quinoline compound.

5. The method of preserving freshly-collected latex which comprises adjusting the pH of the latex to not less than 9.8 nor more than 10.0 and adding not less than 0.01% nor more than 0.20% by weight of the latex of a quinoline compound.

6. The method of preserving freshly-collected latex which comprises treating the latex with sufficient alkali to raise the pH to not less than 9.8 no more than 10.0 and adding not less than 0.01% nor more than 0.20% by weight of the latex of a quinoline compound.

7. The method of preserving freshly-collected latex which comprises treating the latex with sufficient ammonia to raise the pH to not less than 9.8 nor more than 10.0 and adding not less than 0.01% nor more than 0.20% by weight of the latex of a quinoline compound.

8. The method of preserving freshly-collected latex which comprises treating the latex with sufficient ammonia to raise the pH to not less than 9.8 nor more than 10.0 and adding not less than 0.01% nor more than 0.20% of quinoline by weight of the latex.

9. Preserved latex having a pH not less than 9.8 nor more than 10.0 and containing a small proportion of a quinoline compound.

10. Preserved latex having a pH not less than 9.8 nor more than 10.0 and containing an alkali and a small proportion of a quinoline compound.

11. Preserved latex having a pH not less than 9.8 nor more than 10.0 and containing ammonia and a small proportion of a quinoline compound.

12. Preserved latex having a pH not less than 9.8 nor more than 10.0 and containing ammonia and not less than 0.01% nor more than 0.20% by weight of the latex of a quinoline compound.

13. Preserved latex having a pH not less than 9.8 nor more than 10.0 and containing ammonia and not less than 0.01% nor more than 0.20% of quinoline by weight of the latex.

WILLIAM D. STEWART.